United States Patent [19]

Niemela et al.

[11] Patent Number: 5,029,379
[45] Date of Patent: Jul. 9, 1991

[54] METHOD OF MAKING A MOTOR FIELD WINDING WITH INTERMEDIATE TAP

[75] Inventors: Paul Niemela, Pickens; David G. Peot, Easley, both of S.C.

[73] Assignee: Ryobi Motor Products Corp., Pickens, S.C.

[21] Appl. No.: 492,987

[22] Filed: Apr. 27, 1990

Related U.S. Application Data

[62] Division of Ser. No. 258,884, Oct. 17, 1988, Pat. No. 4,926,079.

[51] Int. Cl.⁵ .............................................. H02K 15/08
[52] U.S. Cl. .......................................... 29/596; 310/71
[58] Field of Search ....................... 29/596, 605; 310/71, 310/179, 189, 200, 42; 336/116, 137, 143, 149, 150; 439/391, 393, 426

[56] References Cited

U.S. PATENT DOCUMENTS

| Re. 27,893 | 1/1974 | Miller | 310/234 |
|---|---|---|---|
| 3,979,615 | 9/1976 | Neff | 310/71 |
| 4,322,647 | 3/1982 | Neroda et al. | 310/71 |
| 4,340,829 | 7/1982 | McCoy | 310/71 |
| 4,481,435 | 11/1984 | Loforese | 310/71 |
| 4,585,964 | 4/1986 | Hildebrandt | 310/71 |
| 4,673,834 | 6/1987 | Wrobel | 310/71 |

FOREIGN PATENT DOCUMENTS 731018 2/1943 Fed. Rep. of Germany.
0026089 2/1980 Japan.

Primary Examiner—Carl E. Hall
Attorney, Agent, or Firm—David L. Davis

[57] ABSTRACT

A field assembly for a motor includes a connecting terminal for making electrical contact with a point intermediate the ends of a field winding. A terminal board configuration provides pocket portions for engaging a turn of the winding, including the intermediate contact point, and for retaining the turn of the winding fixed relative to the assembly. The turn is brought out during a winding process and is engaged by one or more of the pocket portions. A frictional terminal is inserted into one of the pocket portions to provide frictional electrical connection to the intermediate point. The terminal boards are each configured to have a plurality of pocket portions. Pocket portions engaging and providing electrical contact with ends of the winding are arranged on terminal boards mounted on one end of the assembly. Pocket portions engaging and providing electrical contact with the intermediate point on the winding are arranged on a terminal board mounted on an opposite end of the assembly.

3 Claims, 3 Drawing Sheets

METHOD OF MAKING A MOTOR FIELD WINDING WITH INTERMEDIATE TAP

This application is a division, of application Ser. No. 07/258,884, filed Oct. 17, 1988, now U.S Pat. No. 4,926,079.

TECHNICAL FIELD

This invention relates to motor windings, and more particularly to improved method and apparatus for making contact with points intermediate the terminals of a field winding without impairing the reliability or expense of the winding process.

BACKGROUND ART

An intermediate tap for a field winding of a motor is desirable for several reasons. Such a tap may be used as a means for changing the motor speed, for example. Additionally, an intermediate tap may be used to provide an output voltage which may be used to activate a lamp or other indicator, to supply power to electronic circuitry, or the like.

In the prior art it has been known to provide contacts to end terminals of a field winding by providing a specialized harness, including four rectangular cavities having cross slots for receiving the terminal ends of each of the two magnet wires. Such a structure is disclosed in Neroda et al., Pat. No. 4,322,647. Therein, a terminal, or solderless connector, is inserted into each of the four cavities. The connector includes slots aligned with the cross slots of the cavity. The terminal slots are constructed to strip insulating material from the magnet wire, thus to make a permanent electrical connection therewith.

However, such a structure cannot, of itself, provide any connection to intermediate points along the field wire.

A similar molded end coil insulator, including therein terminal supports for the four wire terminals, is disclosed in McCoy Pat. No. 4,340,829. Loforese Pat. No. 4,481,435 discloses a friction mounted field coil terminal connector, including upwardly extending, rectangular cross-sectioned, notched connecting wells for securing the four terminal ends of the windings of a field coil.

Other techniques are known for terminating the winding wires (magnet wires) of an electric motor, as illustrated by Hildebrandt Pat. No. 4,585,964 and Wrobel Pat. No. 4,673,834.

The prior art fails, however, to disclose any method or system for making electrical contact to a point intermediate the terminals of a field winding, without terminating (or severing) the wire and thus breaking the electrical continuity thereof.

A separate technique is known for making contact with points along an armature winding by providing a connection to a loop of the winding. For example in Miller Reissue Pat. No. 27,893 it is disclosed that, for an automatically wound armature, anchored leads may be formed between the coils, wherein a length of wire is coursed through a slot adjacent the pairs of slots in which the coil is wound either just before or just after the lead loop or the commutator connection is made. It is recognized therein, however, that such contacts are difficult to make and, accordingly, an improved armature winding pattern is disclosed for tang type connections. However, unless such a specialized winding pattern is used, the connection cannot be easily made, by automatic winding equipment.

Accordingly, when it has been desired to make contact with an intermediate point along a field winding, one approach of the prior art has been to make a tap wire connection to a magnet wire located on the field coil. Such an approach, however, hampers the cooling of the coil in view of the added materials placed directly on the coil and connected thereto.

Alternatively, it has also been the practice of the prior art to provide an intermediate winding tap by stopping operation of a coil winding device and by extending a pawl to engage a long loop of wire (as long as 4 to 6 inches in length) to extend the loop away from the field. Such an approach, however, requires that the added length of magnet wire be fixedly fastened to the structure in a separate processing step. Moreover, upon completion of the winding, the long loop needs to be manually cut to the desired length and the appropriate contact then must be made to the cut loop.

However, such an approach suffers from a number of deficiencies. Of necessity, the winding process is slowed while the loop is extended. Additional labor is required to fasten the loop as well as to cut the loop to length and to make the appropriate contact. Further, because a large loop is pulled from the winding and subsequently cut off, additional wire must be used for the winding. Each of the above factors increases the cost of producing a winding having an intermediate tap. Moreover, because the loop is cut, continuity of current through the winding is impaired, and reliability of such windings deteriorates.

DISCLOSURE OF INVENTION

It is accordingly an object of the present invention to overcome the difficulties of the prior art and to provide a structure permitting making automated contact with an intermediate point of a motor winding, without interrupting the continuity of the magnet wire or incurring the added expense of specialized steps for making contact with the intermediate point.

It is a more specific object of the invention to provide a field assembly of a motor including a terminal board assembly for contacting intermediate points of the field winding.

It is yet a more particular object of the invention to provide a field winding assembly including therein a plurality of pocket portions, specifically including a pair of pocket portions each of which may receive a continuous segment of a loop of the magnet wire forming the field winding.

Still another object of the invention is to provide a plurality of terminal boards, each having a plurality of pocket portions, thereby to provide contact both to terminals of a field winding and to an intermediate point of the winding.

It is yet a further object of the invention to provide terminal boards on both ends of a field assembly, thereby to provide sufficient contact points for both the end points of a field winding and to at least one intermediate point thereof.

A more specific object of the invention is to provide a field assembly for a motor, including a lamination stack, a first terminal board at a fan end of the stack and a second terminal board at a commutator end of the assembly, to provide start and end point contacts for the field windings in pockets of one of the terminal boards, to run a turn of one of the field windings through a pair of slotted pockets in the other of the terminal boards, and to provide a contact for the turn of the field winding at one of the pair of pockets in that (other) terminal board.

An additional object of the invention is to provide an improvement in a method for winding a field coil of an electrical machine, wherein an intermediate turn of the winding is extended to a pair of gripping portions formed on the terminal board of the assembly, and wherein a contact terminal is inserted into one of said gripping portions thereby to provide a terminal connection to the intermediate turn of the winding.

In accordance with the invention, there is accordingly provided an improvement for a field assembly of a motor having a lamination stack, a winding of magnet wire, and a terminal configuration including at least a pair of pocket portions for receiving therein ends of the winding and terminal devices for making electrical contact with the ends. The improvement includes an intermediate contacting structure for making contact with a point on an intermediate turn of the wire between the ends of the winding. More particularly, the intermediate contacting structure generally includes a gripping structure for gripping a portion of the intermediate turn, and a contact device for providing electrical contact to the portion of the intermediate turn of the winding.

The intermediate contacting structure is located on the terminal configuration, which includes first and second terminal boards. The pair of pocket portions for the winding ends are located on one of the first and second terminal boards, and the intermediate contacting structure is located on the other of the terminal boards. Moreover, the first and second terminal boards are mounted to opposite ends of the lamination stack In accordance with another aspect of the invention, the field assembly may include a second winding of magnet wire. In such an arrangement, the terminal configuration includes a third terminal board, having another pair of pocket portions, for receiving the ends of the second winding and for receiving additional terminal devices for making electrical contact with the ends of the second winding. As described above, the terminal boards having the pairs of pocket portions for making electrical contact with the two winding ends are mounted to one end of the lamination stack, and the terminal board including the structure for contacting the intermediate turn is mounted to an opposite end of the lamination stack.

In accordance with the details of the inventive arrangement, the structure for contacting the intermediate turn includes a frictional contacting structure received in the pocket portion of the terminal board, for frictionally providing the electrical contact to the portion of the intermediate turn. In this configuration, the gripping structure includes a pair of pocket portions, each including a frictional engaging device for frictionally engaging the portion of the intermediate turn. The portion of the intermediate turn, which may be gripped by one or both of the gripping structures of the pocket portions, is thus maintained fixed relative to the field assembly.

Preferably, the above described frictional engaging devices are provided in the form of a terminal in each of the additional pocket portions, each terminal including slots for frictionally engaging the portion of the intermediate turn in each of the additional pair of pockets. Moreover, at least one of the terminal devices has an intermediate lead connected thereto, for electrically contacting the portion of the intermediate turn engaged thereby.

The arrangement of the invention further includes a protruding boss for mounting the terminal board to the lamination stack.

Viewed from a different perspective, the present invention is described as a field assembly for a motor, including: a pair of windings of magnet wire; a stack of laminations forming a body of the assembly; and a plurality of terminal boards mounted to the stack of laminations. Each of the terminal boards has at least a pair of pocket portions for providing electrical contact to the ends of the windings. The wire ends are retained in separate ones of the pocket portions for contacting terminal leads. Further, an intermediate terminal lead is connected to a point intermediate the ends of one of the windings. A turn of that winding, including the intermediate point, is retained by one or more of the pocket portions. The pocket portion retaining the turn includes a frictional connector for making frictional electrical contact between the intermediate terminal lead and the intermediate point.

According to the preferred embodiment of the invention, four terminal boards are used, each having a single pair of pocket portions thereon. One pair of the four terminal boards is mounted on one end of the stack of laminations, for providing terminal leads contacting the wire ends of the pair of the windings. A second pair of the four terminal boards is mounted on the opposite end of the stack of laminations. One of the second pair of terminal boards includes the pocket portions retaining the turn of winding including the intermediate point.

According to yet another aspect of the invention, there is provided an i..iprovement in a method of winding a magnet wire to form a field winding assembly of a motor, providing electrical contact to the ends of the magnet wire and to a point of the magnet wire intermediate the ends thereof. The improvement includes the steps of extending a portion of a turn of the wire including the intermediate point to one or two retaining pockets of a terminal board, retaining the portion of wire between the retaining pockets, and providing an electrical connection to the intermediate point, which is retained by one of the retaining pockets.

The step of retaining the portion preferably includes the step of engaging the ends of the magnet wire in respective pocket portions of a terminal board. The engaging step may be carried out by inserting the ends of the magnet wire in pocket portions of a terminal board mounted on one end of the field winding assembly. Moreover, the step of providing an electrical connection may include inserting a frictional connector in one of the retaining pockets of a terminal board mounted to an opposite end of the field winding assembly, as well as providing electrical contact between an intermediate contact lead and the frictional connector.

These and other objects, features and advantages of the present invention will become apparent to those skilled in the art from the following description and drawings, wherein there is shown and described a preferred embodiment of the invention, simply by way of illustration and not of limitation of one of the best modes (and alternative embodiments) suited to carry out the invention. As will be realized upon examination of the specification and from practice of the same, the present invention is capable of still other, different, embodiments and its several details are capable of modifications in various obvious aspects, all without departing from the invention. Accordingly, the drawings and the descriptions provided herein are to be regarded as illustrative in nature and not as restrictive of the invention.

BRIEF DESCRIPTION OF THE DRAWINGS

In accordance with the above described objects and features of the invention, a preferred embodiment thereof is shown in the accompanying drawings, wherein.

BEST MODE FOR CARRYING OUT THE INVENTION

Figure 1:
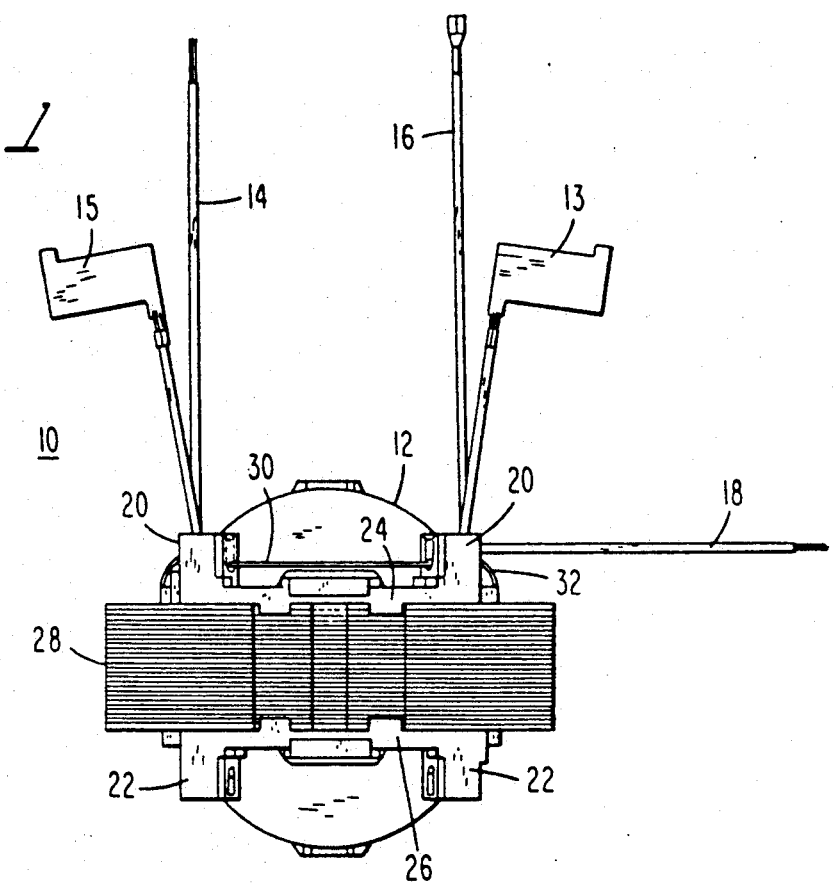
FIG. 1 shows a front elevation view of a field winding assembly according to the invention.

Referring now to the drawings, there is generally shown in FIG. 1, and designated by reference numeral 10, a field winding assembly according to the invention.

Figure 2:
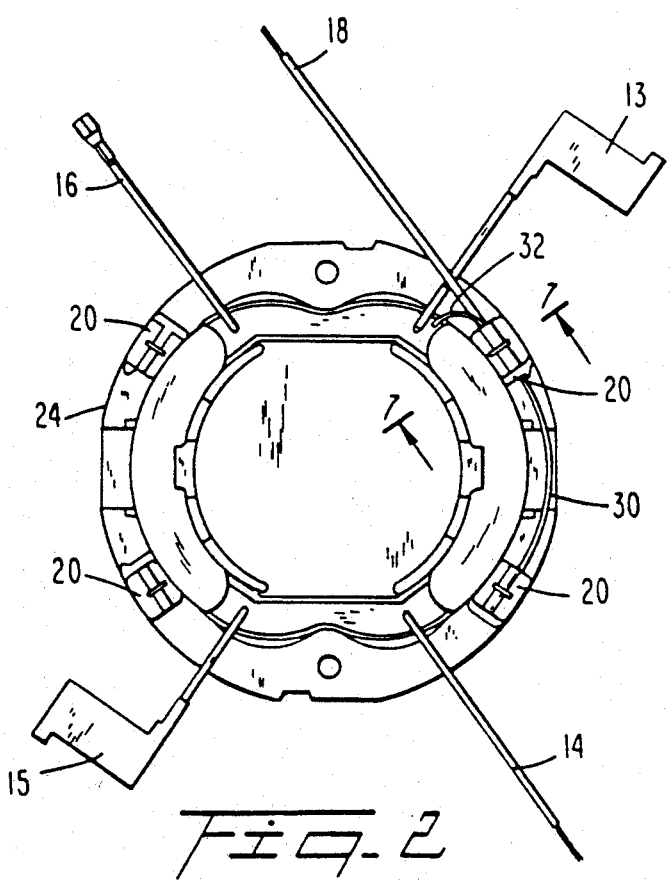
FIG. 2 shows a plan view of the assembly of FIG. 1.

As seen from FIGS. 1 and 2, the field winding assembly of the invention includes a plurality of terminal leads for contacting a pair of field windings, wound about pole piece structure 12. More particularly, there is provided a first pair of terminal leads, 13-14, for contacting a first field winding and a second pair of terminal leads, shown at 15-16, for contacting a second field winding of the assembly. Additionally, there is provided at least one, separate, terminal lead 18 for contacting an intermediate point on the first field winding.

As will be appreciated from the following detailed description, the various terminal leads are connected to the end and intermediate points of the field windings at various pocket portions 20, 22 of a plurality of terminal boards 24, 26.

The assembly includes a typical stack 28 of laminations, as well known in the art.

Figure 3:
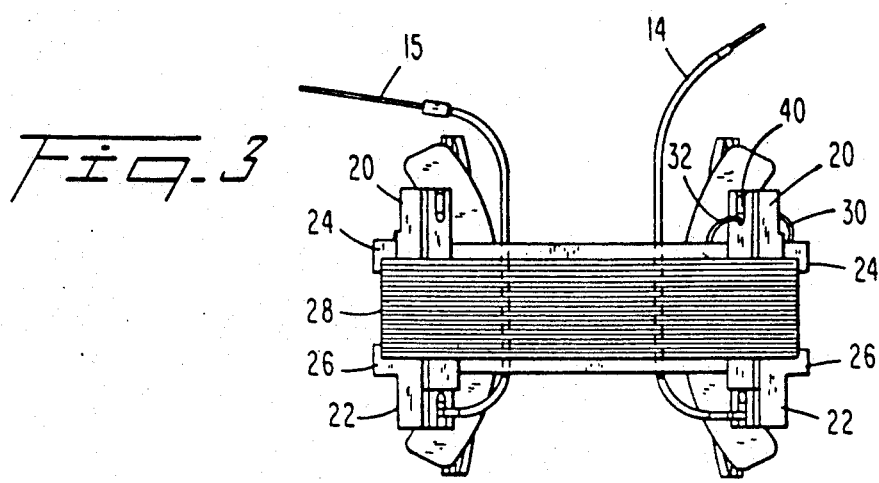
FIG. 3 shows a side elevation view of the inventive assembly.

Referring now to the disclosure of FIG. 3 in conjunction with FIG. 2, it will be appreciated that a first pair of terminal boards 24 is provided at the top end of the lamination stack 28 and that a second pair of terminal boards 26 is provided at the opposite, bottom, end of the lamination stack 28 of the assembly 10.

As will be further appreciated from the drawing figures, the pocket portions 22 of the terminal boards 26 on one end of the assembly are used for making contact with the ends of the field windings while at least one of the pocket portions 20 of the terminal boards 24 on the other end of the assembly is used to make contact with at least one intermediate point of at least one of the field windings. Thus, although a single terminal lead 18 is shown as contacting a single intermediate point of a single field winding in the presently preferred embodiment of the invention, the inventive assembly and structure permits more than one contact to be made with one or more intermediate points of one or more of the windings.

It is to be noted that contact with the intermediate point of the winding is easily attained with the structure of terminal board 24. During a known automatic winding operation for the field winding, one turn is wound through the pocket portions 20 of one of the terminal boards 24. As seen at FIGS. 1, 2 and 3, a portion 30 of the magnet wire turn including the intermediate point to be contacted is connected to the rest of the winding by an end segment 32.

As will be understood from the subsequent description of the terminal boards and pocket portions, pocket portions 20 engage the wire portion 30 in a substantially fixed relationship relative to the rest of the field winding. Moreover, contact with the intermediate point is made by a frictional terminal device inserted in one of the pocket portions.

Thus, the inventive arrangement extends only a short portion of magnet wire from the field winding and automatically retains the same relative to the assembly. In a winding process, the steps of fixing the wire portion to the assembly, as well as cutting the wire to an appropriate length for making terminal contact, are accordingly eliminated. Moreover, the continuity of the field winding is uninterrupted by contacting the intermediate point thereof.

Figure 4:
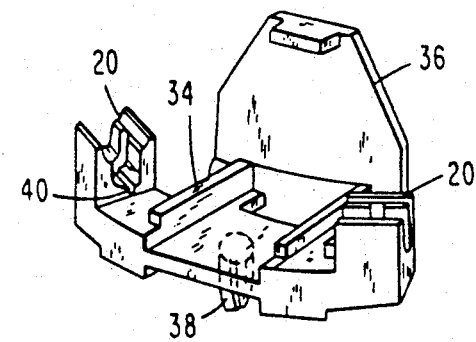
FIG. 4 shows a perspective view of a terminal board structure used in the inventive assembly.

Referring now to FIG. 4, wherein one of the terminal boards 24 is shown in perspective, it is to be noted that the pocket portions 20 project upwardly from terminal board 24. A base portion 34, together with a portion of the laminations (not shown), forms a mandrel about which the magnet wire is wound to form the field winding. An upstanding rear support 36 retains the completed field winding in position. The terminal board is attached to the laminations by a boss 38, which projects downwardly from base portion 34 into a mating hole (not shown) provided in the lamination stack 28.

As is seen in FIG. 4, the pocket portions 20 include various openings and slots 40. The slots are used to engage the wire portion 30. More specifically, the pocket portions 20 and 22 are structured to accept therein various terminal devices, of the types hereinbelow described with reference to FIGS. 6 and 7, for making contact with the various ends and intermediate points of the magnet wires forming the field windings.

Figure 5:
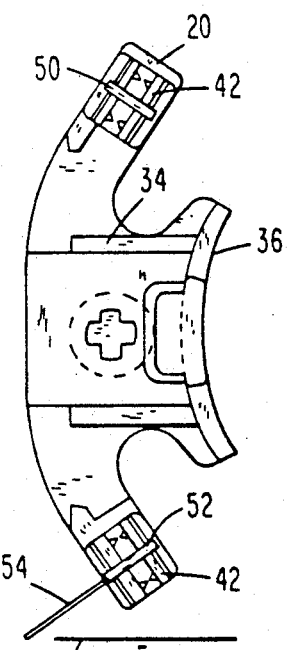
FIG. 5 shows a top view of the terminal board of FIG. 4.
Figure 6:
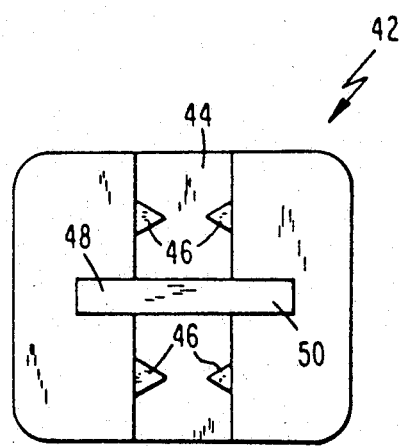
FIG. 6 shows a detail of a first type of frictional terminal device inserted in a pocket portion of the terminal board of FIG. 5.

Referring to FIG. 5, a top view of the terminal board 24 of FIG. 4 shows pocket portions 20 as including therein a first type of frictionally fitted terminal device 42, which is shown in detail in FIG. 6.

The terminal device 42 illustrated in FIG. 6 is used to provide terminals for the ends of the magnet wire forming the various field windings of field assembly 10. More specifically, the terminal device 42 is frictionally fitted within one of the pocket portions 20 or 22. The terminal device 42 includes a channel 44, for receiving therein the wire end. A plurality of teeth 46 project into channel 44, for engaging the end (or other portion) of the wire, and for penetrating the insulation surrounding the conducting core of the wire to make mechanical contact to secure the wire prior to insertion of the terminal.

The terminal device 42 is preferably formed of a conductive material so that the terminal leads 13-16 may be attached directly thereto. In one type of terminal connector, a transverse slot 48 is provided, for insertion of a transverse locking structure 50 to prevent vertical movement of the wire end from channel 44. As seen in FIG. 5, the transverse locking structure may be in the form of a spade lug 52 having a terminal lead 54 extending therefrom.

Figure 7:
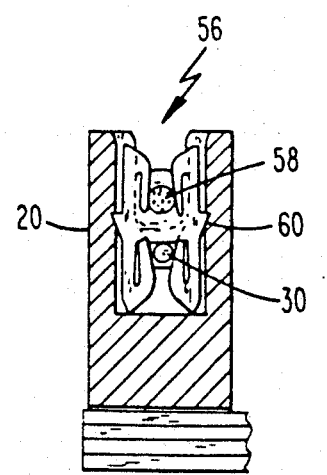
FIG. 7 is a sectional view, taken along line 7—7 of FIG. 2, showing a second type of frictional terminal device, used in FIG. 2 to contact the intermediate point of the winding.

Referring to FIG. 7, a second type of frictional terminal device 56 is shown as inserted in a pocket portion 20 for making contact with the intermediate point along the magnet wire, to provide the desired intermediate tap for the field winding without severing the magnet wire. As shown therein, the terminal device is generally an H-shaped device for engaging both the portion 30 of the magnet wire and a terminal lead 58, shown in FIG. 7 as having a multiconductor core. As is also apparent from FIG. 7, a pair of one-way barbs 60 are provided in the terminal device 56, thus to prevent the device 56 from being vertically removed from pocket portion 20.

As illustrated in FIG. 7, the lower legs of H-shaped terminal device 56, as well as the bottom portion of the transverse portion thereof, are sufficiently sharp to penetrate the insulation surrounding wire portion 30, in order to make electrical contact with the conductor thereof. The terminal lead 58 may be permanently attached to the upper portion of terminal device 56 or, alternatively, may be inserted therein subsequently to insertion of device 56 into pocket portion 20. For such an arrangement, the upper legs of the terminal device (and/or the upper portion of the transverse portion of the H-shaped structure) would also be sufficiently sharp to penetrate the insulation surrounding terminal lead 58.

Thus, according to the invention, wire portion 30 of the appropriate turn of the field winding is wrapped around the terminal board 24 during the winding process. The wire portion is engaged by pocket portions 20 and is maintained thereby in a substantially fixed position relative to the remaining turns of the field winding. When it is desired to make external contact to the intermediate point along the winding, a terminal device 56, of the type shown in FIG. 7, is inserted into the pocket portion. When an intermediate tap is not required, the terminal device may be omitted.

However, the terminal device 56 may be inserted in pocket portion 20 in order to provide further stabilization for the wire portion 30. Upon insertion in the pocket portion 20, the terminal device, which is oriented at a 90° displacement from the axis of the wire portion 30, is forced over the magnet wire and cuts through the insulation thereof to make electrical contact with the conductor. When an intermediate tap is subsequently desired, the terminal lead 58 may be subsequently inserted into the upper portion of the H-shaped terminal device 56, whereupon electrical contact is similarly achieved.

It should be recognized, however, that wire portion 30 may be engaged by teeth 46 of a terminal device 42, of the type shown in FIG. 6, for mechanical contact to secure the wire prior to insertion of the spade lug 52 of the intermediate tap terminal into slot 48 thereof.

Figure 10:
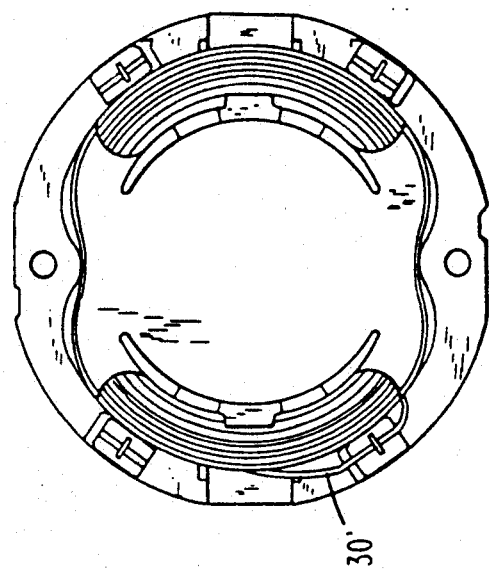
FIG. 10 shows a plan view of the alternate embodiment of FIG. 8, similar to FIG. 2.

Although the foregoing description and drawings refer to engagement of the portion 30 of the magnet wire by a pair of pocket portions 20, it should be recognized that the wire portion may be brought out and looped over only a single pocket portion 20, and that the frictional terminal device 56 of FIG. 7 may thus be inserted in the single pocket portion 20 engaging the portion 30 of the magnet wire looped thereabout. Particularly, FIG. 2 shows the loop of magnet wire 30 as being looped over and engaged by two pocket portions 20. However, FIG. 10 presents an alternate embodiment of the inventive assembly wherein a wire loop 30' is engaged by only a single pocket portion 20. As shown in this embodiment of the invention, the wire loop 30' is engaged by a terminal device 42 of the type previously described with reference to FIG. 6.

Figure 8:
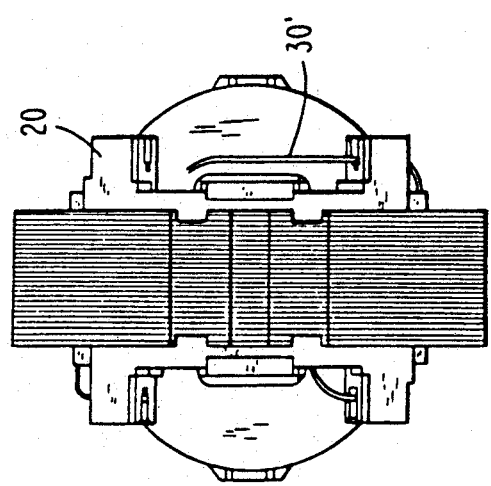
FIG. 8 presents an alternate embodiment of the inventive assembly wherein a wire loop is engaged by only a single pocket portion, shown as a front elevation view similar to FIG. 1.

FIG. 8 presents a view of the alternate embodiment similar to the view of FIG. 1, but rotated by 90°. For clarity, in both FIGS. 8 and 10, the various terminal leads 13-16 and 18 are not shown.

Figure 9:
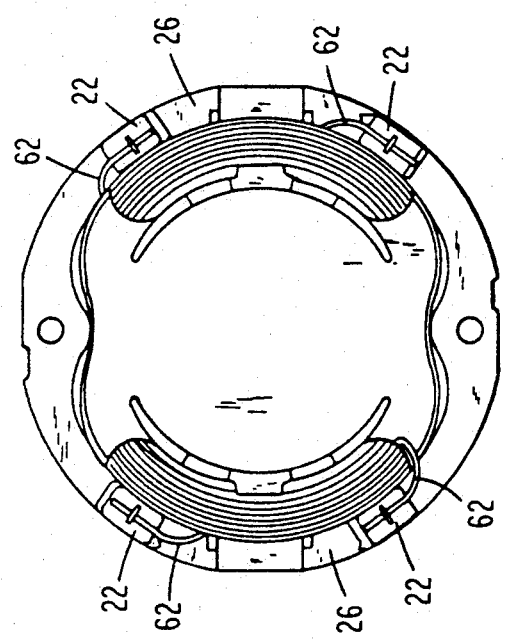
FIG. 9 shows a bottom view of the alternate embodiment shown in FIG. 8.

FIG. 9 shows a bottom view of the alternate embodiment shown in FIG. 8, showing with greater particularity terminals 62 of the coil windings and the engagement thereof by of the pocket portions 22 and the terminal devices therein.

There has thus been described a structure and procedure for providing an intermediate tap for one or more windings of an electrical machine. In accordance with the invention, there are provided terminal boards, including therein a plurality of terminal pockets, for making the desired electrical connection to points intermediate the ends of the winding without severing the winding. A portion of the winding is brought out to one or more of the terminal pockets. Any unused terminal pockets may be used as a lead trap, to hold the intermediate tap wire in position as it is routed to its exit point from the motor. Terminal devices are used to provide electrical contact between terminal leads and the magnet wire of the winding. While terminal contacts to the winding ends are brought out through pockets on a fan end of the field assembly, the intermediate tap is made by providing a contact on the commutator end of the assembly.

Advantageously, the disclosed connection does not break or cut the magnet wire, thus enhancing reliability. Moreover, less wire is used because a large loop of wire is not required to be pulled and later cut off. The tap lead may be added during assembly of the product or may not be used at all, thus allowing flexibility in manufacturing and permitting standardization of parts. By placing the intermediate tap on the opposite end of the assembly, a standardized design may be used for all the terminal boards used in the assembly. Moreover, by locating the tap wire and connection away from the field coil, improved cooling of the coil is obtained. Further, by providing the intermediate tap in the vicinity of the end terminals of the winding, reliability thereof is made as good as that of the end terminal connections. Since the tap lead may be placed in either terminal pocket, and may exit the pocket in either direction, four possible lead routines are available for one field.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

We claim:

1. In a method of winding a magnet wire to form a field winding assembly of a motor and providing electrical contact to the ends of the magnet wire forming a field winding and to a point of said field winding intermediate said ends, the improvement comprising the steps of:

providing a first terminal board having retaining pockets on a first end of said field winding, providing a second terminal board having retaining pockets on a second end of said field winding, engaging the ends of said magnet wire in respective retaining pockets on said first terminal board, extending a portion of a turn of said wire including said intermediate point to one of said retaining pockets on said second terminal board, retaining said portion by said one of said retaining pockets on said second terminal board, and providing an electrical connection to said intermediate point retained by said one of said retaining pockets on said second terminal board.

2. The improved method of claim 1, wherein said step of providing an electrical connection comprises the step of inserting a frictional connector in said one of said retaining pockets on said second terminal board for making electrical contact with said intermediate point.

3. The improved method of claim 2, wherein said step of providing an electrical connection comprises the further step of providing electrical contact between an intermediate contact lead and said frictional connector.

* * * * *